Dec. 31, 1963

H. W. KRUGER 3,115,773

MICRO-PRESSUROMETER

Filed Sept. 30, 1960

INVENTOR
Herbert W. Kruger

BY Thomas, Weisman & Russell
ATTORNEYS

INVENTOR
Herbert W. Kruger

United States Patent Office 3,115,773
Patented Dec. 31, 1963

3,115,773
MICRO-PRESSUROMETER
Herbert W. Kruger, Portland, Oreg., assignor to Lamb-Weston, Inc., Weston, Oreg., a corporation of Oregon
Filed Sept. 30, 1960, Ser. No. 59,659
11 Claims. (Cl. 73—141)

This invention relates to an instrument for the measuring and testing of the relative hardness of certain types of materials. The invention is more particularly directed to a measuring instrument of this type, adapted to be attached to any standard type of microscope, and therefore applicable to the testing of particles of microscopic or near-microscopic size; in the instant case, the micropressurometer herein disclosed is designed, in its primary aspects, for the testing of the cellular strength of almost any type of vegetable structure, although the instrument is useful for test purposes outside of this designated field.

It has been found that strength or hardness measurements of the cells of given vegetables, or fruits, provide a valuable background for the assessment of applicable or intended procedures used in processing such products, such processing including, for example, dehydration, freezing, impregnation, treatment for purpose of extending storage or shelf life of such product, and related methods and mechanical manipulations having to do with improved techniques in preservation of such food products.

In the instant case, and although not confined thereto, the instrument of the invention is described with particular reference to its use in obtaining measurements of the relative strength of the individual cells, as even the starch granule, of the potato. Considering that such starch granule exhibits a size average of about 100 microns by 60 microns, it is to be appreciated that any device for testing the hardness thereof must not only be capable of extremely fine adjustment, but must also exhibit the ability to render accurate readings of minute variations in applied pressure. It is the primary objective of this invention to provide such an instrument.

It is a further purpose of this invention to provide an accurate measuring device utilizing a unique type of optical, transparent pressure head which permits continuous observation of an individual cell or object while under the microscope and while measured amounts of pressure are applied to the same.

It is a further purpose of this invention to provide an accurate measuring device of the described type which utilizes a torsion wire or bar as support for the pressure head, the predetermined amount of rotation of which exerts pressure upon the pressure head and consequently upon the cellular material or cells positioned beneath the pressure head and between the latter and the substage of the microscope upon which the instrument is mounted.

Another objective of the invention is the provision of a device of this nature which, by a unique zero adjustment mechanism permits the calibrating of the pressure indicator, so that as a series of cells are tested for comparative strength or the comparative strengths of different materials are tested, the test results are extremely accurate inasmuch as the pressure head can always be zeroed exactly to the proper index point prior to actual imposition of pressure upon the object or material being investigated. In line with this, such zero adjusting mechanism is so designed as to exhibit extreme accuracy and to permit accurate comparison and evaluation of the calibrated results obtained.

In addition, there is a further objective of the instant invention—to obtain these extremely fine measurements by means of an instrument that is representative of the utmost simplicity, comparatively easy to manufacture, and adaptable, as indicated, to various types and sizes of optical instruments, particularly microscopes.

The invention has many substantial advantages. In addition to permitting continuous observation of various types of cellular structures while variable pressures are applied thereto, the observer may determine the response of either individual or clusters of such cells to varied and measured amounts of pressure which can be increased or decreased at the will of the operator. The rupture or bursting point of such cells can be readily determined; thus as stated above, and particularly with respect to potato cells, the amount of pressure to rupture the cell, when determined, enables the researcher to in turn determine the ability of that particular cell to withstand certain mechanical treatment, e.g., treatment which may involve the mashing of the potato prior to further processing.

With the instrument of the invention available, microscopic observation is possible of the nature of the cell contents as such are forced from the interior of the cell through the point or points of rupture. The character of the cell wall itself can be observed; such wall may burst suddenly over a large area, crack, crumble or rupture at a single point, perhaps due to abrasion through previous mechanical processing steps. Determination of the degree to which the starch within, for example, a potato cell has retrograded, can be observed. The instrument also permits measurement of the resistance of a given cellular structure to mechanical manipulation, as by rolling or sliding the cell between the pressure head of the instrument and the pressure plate thereto. In addition, the instant micro-pressurometer renders possible the determination of the nature and strength of the binding material between cells, accomplished by manipulating clusters of two or more cells between the optical pressure head and the pressure plate.

All of these operations are important in the determination of the nature or character of a given cellular structure. In turn, that information is essential to the understanding of possible damage or benefit to such cellular structure which can be obtained through proposed vegetable or fruit treatment procedures.

In summary, the combination of the instant invention revolves about the use of a relatively small pressure head of ground and polished glass, the sides of which are parallel. This pressure head is mounted upon a spring steel torque wire—a wire of considerable tensile strength. Piano wire of predetermined size represents a good example of the type of wire suitable for use in this instrument. The torque wire constitutes the sole support for the pressure head and pressure is induced by twisting of, or application of torque to, the wire so as to impose ultimate pressure upon the object being observed, the latter being positioned between the pressure head and an appropriate pressure plate (here the microscope slide), and also in line with the eyepiece of the microscope. A rotatable scale attached to one end of the torque wire indicates the amount of turn or twist imposed thereon and therefore will indicate the relative amount of pressure as applied to different materials; such scale can be graduated and regulated to conform to measurements of pressure in customary units of pressure. At the opposite end of the torque wire a means is utilized which enables "zeroing" or positioning the aforesaid scale at a zero position before application of pressure to the object under observation, such zeroing mechanism permitting this adjustment while at the same time maintaining a constant and predetermined amount of tension or stress upon the torque wire.

The invention is now more particularly described herein with reference to the accompanying drawings, in which:

FIGURE 9 is a top plan view of an alternate form of pressure head; and

FIGURE 10 is a side view of the pressure head shown in FIGURE 9.

Figure 1:
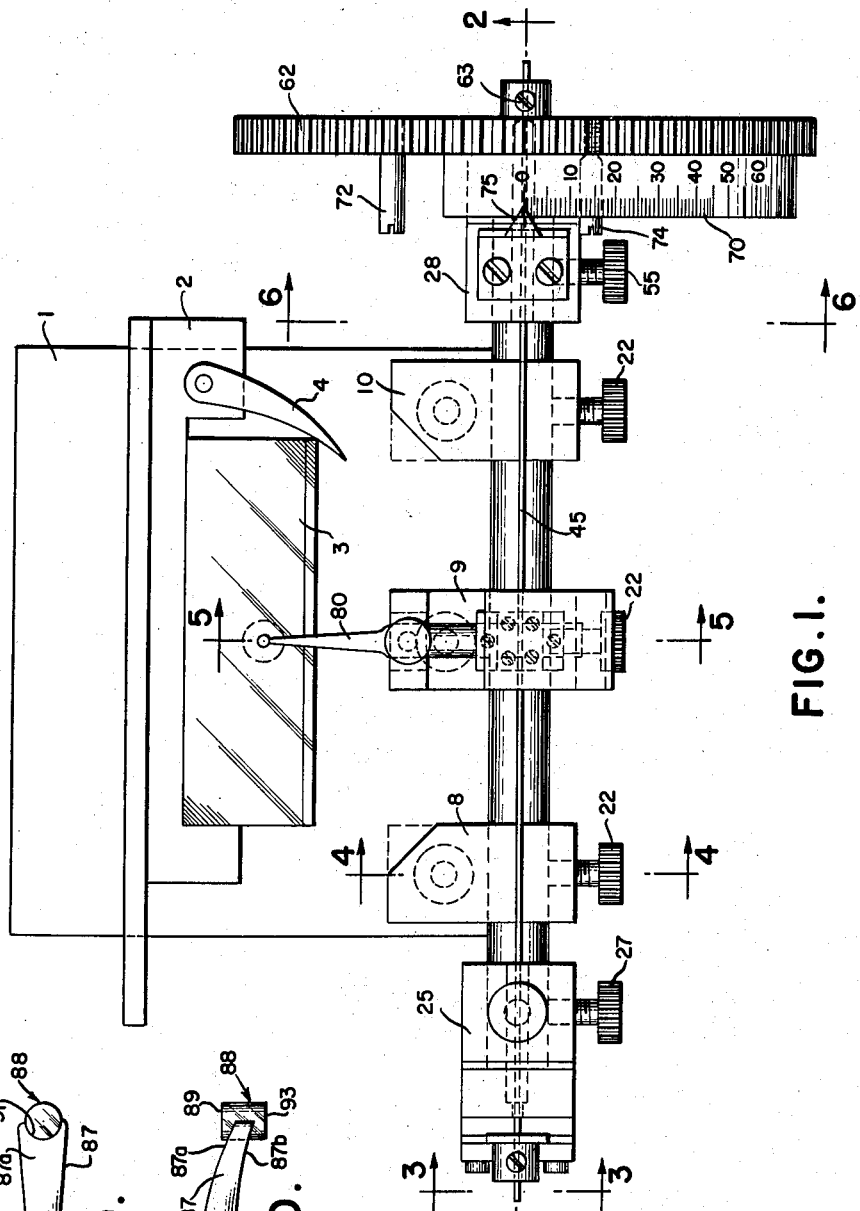
FIGURE 1 is a plan view of the invention illustrating the relative positioning and preferred proportional size of the various elements thereof.

Referring more particularly to these drawings and especially FIGURE 1 thereof, the stage of the usual type of microscope is indicated at 1. A sliding mechanical stage 2, typical of instruments of this kind, supports within a rectangular cut-out portion thereof, a microscope slide 3 and the latter is retained in place by means of the usual spring-biased clamp device 4 attached to the substage. Only the objective tube 5 of the microscope is here shown for illustrative purposes. The referred to movable substage 2, as is well known, aids in adjustment and placement of the object in a direct line with the microscope eyepiece.

The device of this invention is attached to the microscope stage by a series of clamps of which three are here shown as elements 8, 9 and 10. These are evenly spaced from one another and clamped directly upon the stage by means of lock screws 12, each of such elements having a rectangular groove 13 cut therein to receive the stage. To prevent damage to the latter, the top of the groove 13, or clamping surface, is padded with plastic, rubber, or other suitable material such as indicated at 15.

Figure 4:
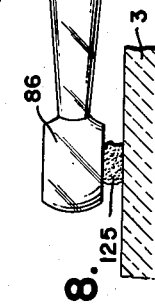
FIGURE 4 is a section view taken on the line 4—4 of FIGURE 1.

These clamps provide support for an assembly holding bar 20 which is positioned within appropriate apertures or bores provided in each of the clamps 8, 9 and 10. (See FIGURES 4 and 5.) Since the clamps can be positioned at any point along the holding bar 20, they are adapted to fit almost any type of microscope stage. Alternatively, clamps of different size or design may be substituted if required for special purposes. The holding bar, to which all sub-assemblies are attached, is securely held within these clamps by means of the knurled nuts 22, and such bar 20, with its accompanying appliances, may be moved laterally or rotatively positioned as a preliminary step in accurate location of the pressure head in contact with the material to be tested.

This assembly holding bar 20 provides support at one end thereof for a zero adjustment assembly which is attached to the mounting block 25. At the opposite end of the holding bar a mounting block 28 supports a pressure adjusting dial provided with a suitable scale to indicate amount of rotation, and hence amount of pressure applied.

Figure 2:
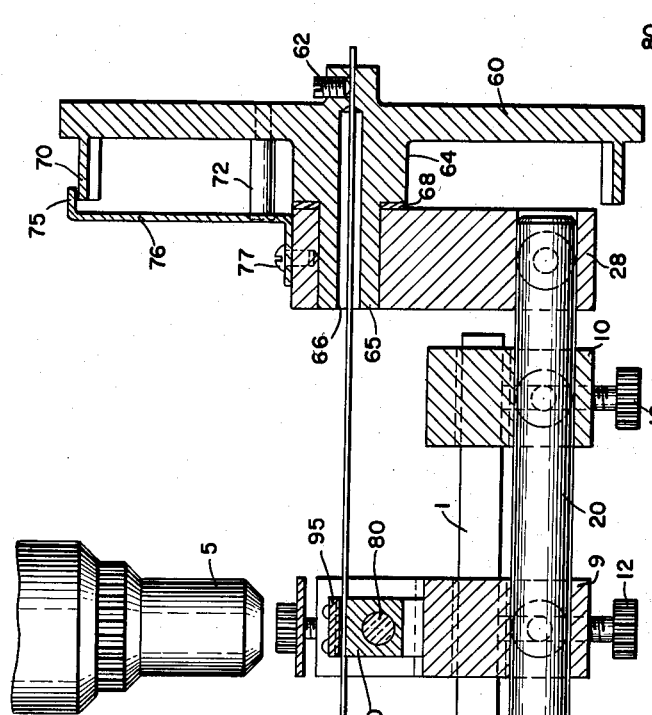
FIGURE 2 is a section view taken on the line 2—2 of FIGURE 1.
Figure 3:
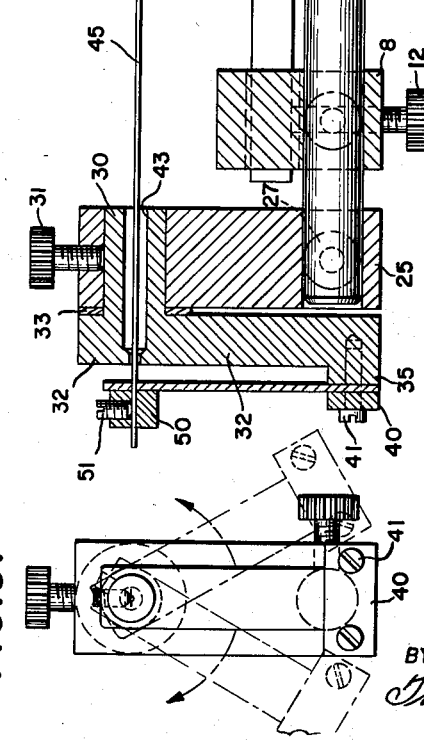
FIGURE 3 is a section view taken on the line 3—3 of FIGURE 1.
Figure 7:
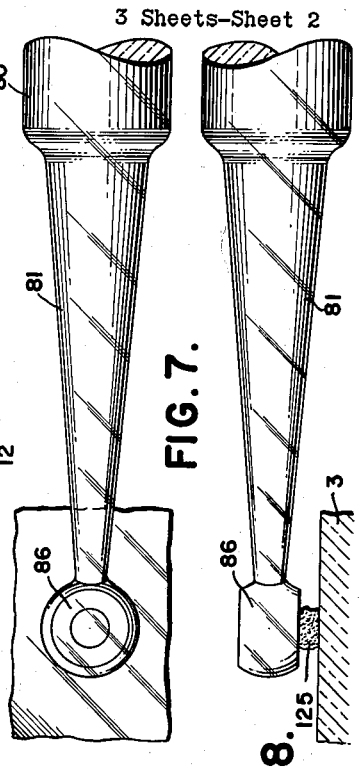
FIGURE 7 is an enlarged plan view of the transparent, optical pressure head of the instrument.

Referring to the first of these, the block 25, it is seen that the same is suitably apertured at its lower portion to receive the transverse bar 20. Also, it is locked in the desired position by the lock screw 27. As stated, this block 25 in turn provides support for the zero adjustment assembly. The latter consists of an elongated element 32 having a shaft 30 which fits into an appropriate bore in the upper end of the block 25. Such element 32 can thus be rotated until positioned where desired and then locked in the adjusted position by the zero adjustment lock screw 31. The element 32 is separated from the block 25 by an intermediate washer 33 (see FIGURE 2).

At is lower end the element 32 terminates in a right angular extension or shoulder 35 to which is attached a torque wire tension spring 38. Such spring is biased to exert a constant thrust outwardly and is of such material as spring steel. Thus, it places a predetermined amount of tension upon the torque wire. The latter comprises the sole support for the pressure bar, in a manner to be later described.

The tension spring 38 is maintained in position upon the projection above mentioned of the member 32 by a plate or tension spring holding block 40 which is affixed in any usual manner to such projection, as by screws 41.

The upper end of the tension spring 38 is apertured to receive the steel spring torque wire 45. Also, the shaft 30 is provided with an enlarged bore 43 to afford ample clearance for the wire. The size of the wire selected is determined by the maximum pressure required under the optical pressure head. It should be noted also that if a considerable change in wire size is required, it may be necessary to increase the distance between the point of attachment of the pressure head arm to the torque wire and the locking clamp at the opposite, pressure adjusting end of the assembly. At any rate, at this, or the zeroing end of the assembly the torque wire passes through spring 38 and thence through a torque wire clamp 50, the latter being similarly apertured for reception of the torque wire. When adjustment has been made, i.e., the pressure head located upon the microscope stage at the desired position, and proper amount of tension placed upon the torque wire, the latter is locked into position at this end of the stage by the torque wire locking screw 51.

The similar mounting block 28 at the opposite end of the stage or assembly is provided to support the pressure indicating dial and its related components. The block 28 is appropriately positioned on the bar 20 and then secured thereto by the lock screw 55. The dial consists of a wheel 60, knurled about its periphery as indicated at 62 to enable it to be easily grasped and turned. The wheel 60, having the usual hub 64, is also provided with a shaft 65 which, similar to the shaft 30, is fitted within a complementary bore in the mounting block 28. As in the case of the shaft 30, such shaft 65 and hub 64 are provided with an internal bore 66 of such diameter as to afford ample clearance for the torque wire 45. The wheel 60 is thus mounted to freely rotate at the desire of the operator.

The torque wire at this pressure adjusting end of the assembly is inserted through an appropriate bore of the same approximate size in the wheel 60 and maintained in its desired position under tension by means of the set screw 63.

It will be understood from the foregoing description given thus far that the torque wire is thus stretched or tensioned between the two opposite sides of the assembly, supporting the pressure bar by means which permit of ready adjustment and accurate alignment and contact with the material or object to be tested while under microscopic examination.

In the manipulation of the invention, pressure is exerted upon the material to be tested by rotation of the pressure adjusting wheel 60, such rotation consequently turning or twisting the torque wire 45. The twisting thereof will force the pressure bar downwardly, the latter being directly connected to the torque wire in a manner to be described. In order to measure the amount of force required to rupture or break the object under consideration, a dial indicator 70 is mounted on the inner side of the wheel 60. Such dial may be calibrated either in metric or English units of weight, determined by observing the various values of torque, or force, necessary to lift weights of known values suspended from the center of the pressure head. At any rate, and even if not so calibrated, the scale will indicate an arbitrary and relative measurement of force required which can be utilized for determining the comparative strengths of different materials or different cellular structures.

The mounting block 28 also provides support for the graduated dial index 75, made integrally with the element 76, the latter being directly attached as by screws 77 to the upper edge of such mounting block.

Figure 6:
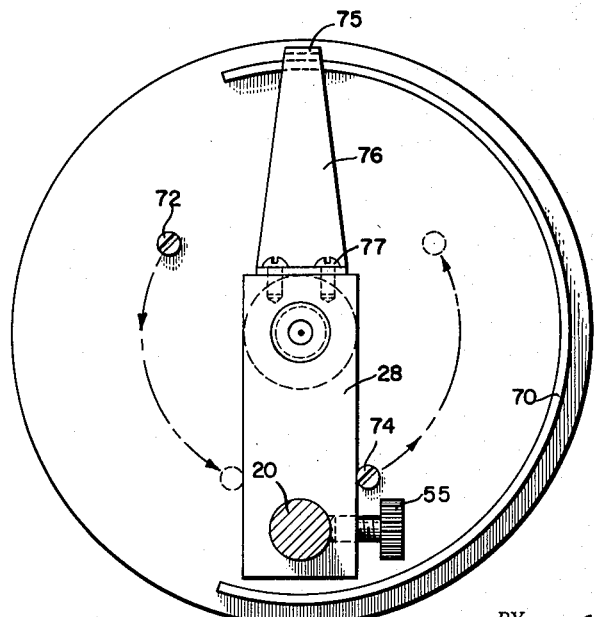
FIGURE 6 is a section view taken on the line 6—6 of FIGURE 1.

Means are provided to prevent the operator from rotating the pressure control dial 62 beyond the elastic limit of the steel torque wire and thus upsetting the zero adjustment by creating a permanent set in the wire. Such means take the form of two limit stops 72 and 74, here shown as screw elements or projections affixed to and extending from the interior side of the wheel 60. These limit stops, as indicated in FIGURE 6, contact the respective sides of the block 28 and prevent further rotational movement in either direction upon contact with such block. In this preferred embodiment of the invention, such stops limit the movement of the control dial to an arc of approximately 100°.

Particular reference will now be made to the manner by which the optical pressure head is attached for rotary movement to the torque wire 45.

The optical pressure head may be fabricated entirely of glass. It consists of an elongated tubular portion 80 terminating in a conical formation or pressure head arm 81, the latter providing direct support for the optical pressure head itself. This head is inclusive of a highly polished glass center 86 which is optically transparent. It is made of a glass having flat parallel surfaces, both surfaces being ground and polished. Preferably, the glass is of the highest quality so that a minimum amount of distortion is introduced when objects under observation and test are viewed through it. Such pressure head may be fabricated of different sizes for use under various powers of magnification. Also, where it is desired to determine the ability of a given cellular structure to withstand mechanical manipulation by rolling or sliding the cell between the pressure head and the pressure plate, the pressure head may be provided with a ground but unpolished lower surface.

In an alternate form of the optical pressure head, the arm and holding means for the pressure head itself may be fabricated of steel. This variant is illustrated in FIGURES 9 and 10 where the pressure head arm, still designated 80, terminates in a tapered formation 87, a top wall 87a and the bottom wall 87b of which, are tapered or converged towards each other as shown in FIGURE 10. The end of this tapered formation or holding means 87 is provided with a semi-circular shape adapted to match the circular or cylindrical configuration of the pressure head itself, here generally designated at 88.

As indicated before, such pressure head 88 is formed with parallel top and bottom sides 89 and 93 respectively. The pressure head 88 is preferably cemented into the circular configuration of the holding arm by high strength cement such as epoxy cement. By such construction, the pressure head can be positioned always parallel to the plate surface. This type of pressure arm also more easily permits covering the entire surface of, for example, a 2″ by 2″ pressure plate. As previously indicated, the cylindrical pressure head 88 is cut by conventional methods from high quality glass plates of predetermined thickness. The ends 89 and 93 of the pressure head cylinder are formed with exactly parallel surfaces. If necessary, both sides of the glass plates may be polished flat prior to cutting the cylindrical heads.

The tubular section 80 of the optical pressure head is supported by the torque wire 45 through an appropriate clamping block 90. Provided with a suitable bore to receive the portion 80 of the optical pressure head, the block 90 can be tightly interconnected with the latter by means of the usual set screws 92. The upper surface of the block 90 is provided with a transverse medial V-groove for reception of the torque wire 45. A plate 95 with a like transverse V-groove on its lower side to receive the torque wire 45 is clamped to the block 90 by means of the screws 96 (see FIGURE 5). In other words, the torque wire is rigidly maintained between the block 90 and plate 95 in the V-grooves of each. The torque wire thus affords sole support for the pressure head 86, the latter being mounted right angularly with respect to the torque wire, such that a turning or twisting of the wire results in rotary and downward movement of the pressure head upon the object being tested.

Because of the delicate nature of this micro-pressurometer device, a guard is provided for the mount 90 which attaches the pressure head arm to the torque wire, as above described. This guard consist of a U-shaped element 100 (FIGURE 5) that is affixed to the central clamping block 9 in any usual fashion, as by screws 102. The latter permit easy removal of the guard 100, rendering accessible the torque wire clamp for adjustment and positioning of the pressure head after the assembly has been secured to the microscope stage. In equipment of this type, it is manifest that the pressure head is comparatively fragile. If the projecting pressure head be accidentally touched or moved, as for example, by catching the same on a plastic microscope cover or by motion of the hand, such sudden jar may snap the pressure head from the small diameter extension 81 between the pressure head arm 80 and the pressure head itself, 86.

In addition, a further means is utilized to limit the motion of the optical head 86 so that it cannot be accidentally raised to contact the microscope objective 5. Such means consists of a support 110, affixed in any usual manner to the same block 9, the support 110 being threaded at its center point to accommodate an adjusting screw 112. By means of the latter, it is obvious that the upward motion of the pressure head can be controlled within definite limits, the screw 112 being adjusted to the desired amount of controlled movement. It is obvious also that the screw 112 is positioned directly over the optical pressure head to prevent upward movement in the manner just described.

From the foregoing description, the operation of the micro-pressurometer of this invention should be readily apparent. In summary, the basic component of the device, around which the mounting and actuating components are designed and constructed, is the optically transparent pressure head 86. In use, such pressure head is positioned between the microscope objective and the pressure plate or slide 3, the latter being in turn secured to the mechanical stage 2 of the microscope. In most cases, such microscope slide 3 is itself quite satisfactory for use as the pressure plate which directly supports the object and against which such object is pressed by the pressure head for visual observation of fracture thereof and for measured observation of the amount of pressure so utilized through the dial indicator 70. By manipulating the various clamping blocks 8, 9 and 10, the pressure head can be positioned to be centrally located in the field of view as seen through the microscope eyepiece. The mechanical stage 2 of the microscope is then manipulated to bring the subject under observation to a central position under the transparent pressure head 86. The latter is then moved downwardly, by means of the pressure adjustment dial mechanism 62, until the lower surface of the pressure head contacts the subject under observation. At this position, the graduated dial 70 should read zero at the index mark on the index bar 75. If the zero on the graduated dial is not opposite the index mark the dial is set for zero and the zero adjusting mechanism represented by the element 32 and assembly related thereto and described above, is then manipulated in the following manner: the set screw 31 on the block 25 is loosened sufficiently to permit rotation of the element 32 in the desired direction. The operator so rotates such element to cause the pressure head to contact the subject (the indicator dial still reading zero). The zero adjustment mechanism, by the set screw 31, is again then locked in position. At this point it may then be necessary to refocus the microscope. At any rate, it is seen that the entire zero adjustment assembly can thus be rotated to position the optically transparent pressure head in contact with any object on the pressure plate at that point where the graduated pressure control dial 70 has its zero opposite the index 75, at which point such assembly is locked in place.

In the foregoing adjustment procedure, it will be appreciated that tension upon the torque wire 45 has remained constant. This is because the same, even amount of tension is maintained upon the torque wire by the tension spring 38 which, as stated above, constantly exerts outer thrust against the torque wire clamp 50.

Figure 5:
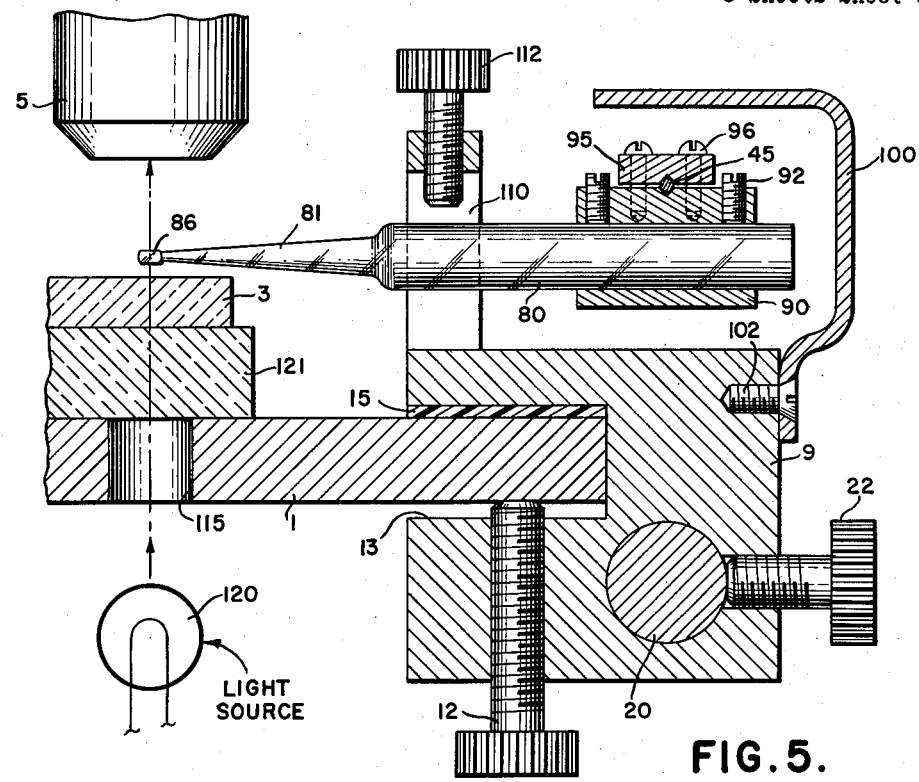
FIGURE 5 is a section view taken on the line 5—5 of FIGURE 1.

After the zeroing procedure has been accomplished in the manner just described, pressure may now be increased by rotation of the dial 70 in a clockwise direction (counter-clockwise as viewed in FIGURE 5). In other words, as torque is applied to the torque wire by such rotation of the dial while the zero adjusting end of the wire (at block 25) is locked so that it cannot rotate, a torque is applied to the pressure head arm resulting in a downward force on the pressure head which is proportional to the angle through which the pressure control dial 70 has rotated.

Normally, it is desired to determine the amount of pressure applied causing rupture of the object under examination, and such amount of pressure can be read by reference to the position of the graduated dial. Alternatively, and if so desired, the subject under observation may be rolled or slid between the pressure plate and the pressure head by manipulating the substage of the microscope. In any event, the effect of increasing pressure on the one hand, or the effect of rolling or sliding the object on the other, can thus be continuously observed through the microscope eyepiece.

Figure 8:
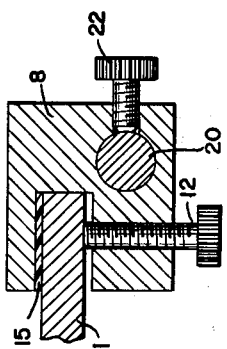
FIGURE 8 is an elevation view of the pressure head as shown in FIGURE 7, illustrating the manner in which pressure is exerted upon a given cellular structure for the purpose of determination of its breakage point.

This relationship of pressure head, pressure plate and the object under observation is depicted in FIGURE 8 where such object is designated 125. It is of course obvious that a light source 120 is positioned below the light opening 115 of the microscope stage, so as to direct light through the pressure plate or slide 3, to the object and to the microscope itself. If desired also, the assembly can include an elevating block 121 positioned in between pressure plate 3 and the main stage 1 of the microscope. Such elevating block is necessarily of glass, and transparent to light from the light source.

As stated, measurements of pressure to the finest degree can be obtained through the use of the micro-pressurometer herein described and claimed. The effectiveness and accuracy of the instrument are achieved by use of the novel combination which inherently resides in the use of an optical pressure head of the described type which is so mounted upon a torque wire as to reflect even to the slightest degree variations in pressure imposed upon the object under consideration. The utility of the device is further enhanced by the unique means used for "zeroing" or adjusting the indicator dial while the torque wire remains under constant and controlled tension.

While the present invention has been illustrated and described in the foregoing with reference to one particular embodiment thereof, it is not intended that it be limited to that embodiment nor otherwise than by the terms of the claims appended hereto.

I claim:

1. In a pressure testing device for testing materials and adapted to be mounted upon a microscope, a transparent pressure head adapted to contact said materials while under microscopic examination, opposed torque wire supporting means, a torque wire mounted between said supporting means, said pressure head being mounted at one end on said torque wire and extending transversely therefrom for rotary movement responsive to rotary movement of said torque wire, means to rotate said wire for downward movement of said pressure head on said materials, means to measure the amount of said rotation, said means comprising a calibrated dial responsive to said rotation means, and means to zero said dial prior to the application of pressure to said pressure head, whereby the relative amount of pressure exerted upon said materials by said pressure head can be determined.

2. In a pressure testing device for testing materials and adapted to be mounted upon a microscope, a transparent pressure head adapted to contact said materials while under microscopic examination, opposed torque wire supporting means, a torque wire mounted between said supporting means, means to place said torque wire under tension, said pressure head being mounted at one end on said torque wire and extending transversely therefrom for rotary movement responsive to rotary movement of said torque wire, means to rotate said wire located at one end thereof, means to measure the amount of said rotation, said last-named means comprising a calibrated dial in association with said rotation means, and means to zero said dial prior to rotation thereof while said torque wire remains under said tension, whereby the relative amount of pressure exerted upon said materials by said pressure head can be determined.

3. In a micro-pressurometer adapted to be mounted upon a microscope for observation of the behavior of materials microscopic and near microscopic in size while said mataerials are subjected to pressure, an optically transparent pressure head adapted to contact said materials while under microscopic examination, said pressure head having parallel, ground and polished surfaces, opposed torque wire supporting means, a torque wire mounted between said supporting means, means to place said torque wire under a predetermined amount of tension, said pressure head being mounted at one end on said torque wire and extending transversely therefrom for rotary movement responsive to rotary movement of said torque wire, means to apply torque to one end of said wire, and means to measure the amount of said torque so applied comprising a calibrated dial in association with said torque applying means, whereby the relative amount of pressure exerted upon said materials by said pressure head can be determined.

4. In a pressure testing device for testing materials and adapted to be mounted upon a microscope, the combination of a torque wire suspension assembly, said assembly having means at each end thereof to support said torque wire, a torque wire extending between and mounted at each end in said support means, one of said ends having means to rotate said wire, said one end being provided with a rotation indicator means, the other of said ends having means to maintain said wire under tension and to permit presetting of said indicator while under tension, a pressure means transversely mounted at one end thereof on said torque wire and adapted to rotate therewith, said pressure means comprising an optical pressure head adapted to permit microscopic observation of said materials while subjected to pressure, said wire rotating means inducing downward movement of said pressure head to exert pressure on said materials.

5. In a micro-pressurometer adapted to be mounted upon a microscope for observation of reaction to pressure of materials of near microscopic and microscopic size, the combination of a torque wire suspension assembly, said assembly having a subassembly at each end thereof to support said torque wire, a torque wire extending between said subassemblies, one of said subassemblies having means to rotate said wire, said rotation means being provided with a rotation indicator means, the other of said subassemblies having means to maintain said wire under tension and to permit presetting of said indicator means to zero while under said tension, a pressure means mounted at one end on said torque wire and adapted to rotate therewith, said pressures extending transversely from said torque wire, said pressure means comprising an optical pressure head having parallel, ground and polished sides, and adapted to permit microscopic observation of said materials while subjected to pressure, said wire rotating means inducing downward movement of said pressure head to exert pressure on said materials.

6. In a micro-pressurometer for testing materials and adapted to be mounted upon a microscope, the combination of a torque wire suspension assembly, said assembly having means at one end thereof to apply tension to a torque wire, the other end of said assembly having means to rotate said wire, a torque wire mounted in said suspension assembly, said rotation means being provided with a rotation indicator means, said one end having means to permit rotation of said wire to permit presetting of said indicator means to zero while said torque wire is under tension, a transparent pressure head mounted at one end on said torque wire and adapted to rotate therewith, said pressure head extending transversely from said torque wire, said pressure head comprising a transparent glass having parallel, ground and polished surfaces and being adapted to permit microscopic observation of said materials while subjected to pressure, said wire rotating means inducing torque in said wire with consequent downward movement of said pressure head to exert pressure on said materials, said assembly having adjustable clamping blocks for attachment to said microscope, said clamping blocks permitting adjustment of said assembly to position said materials under the said microscope.

7. A transparent pressure application device for use in application of pressure to materials microscopic and near microscopic in size, said device comprising a supporting shaft, said shaft terminating in a glass optical pressure head having parallel, ground and polished sides, means to subject said materials to pressure of said pressure head, said means comprising a torque wire mounting means, a torque wire supported by said mounting means, a pressure head support on said torque wire, said shaft being affixed in said support transversely with respect to said torque wire, means to apply rotary motion to said torque wire and means to calibrate amount of pressure applied by indexing the amount of said rotary motion.

8. A device as recited in claim 7 wherein said supporting shaft is of glass and made integrally with said pressure head.

9. A device as recited in claim 7 wherein said torque wire is provided with a tension means therefor at one end thereof, said tension means having means in association therewith permitting rotation of said torque wire for zeroing said calibration means prior to application of rotary motion to said torque wire.

10. A device as recited in claim 9 having an assembly for support of said device on a microscope stage, said assembly including opposed and adjustable clamping blocks adapted to clamp to said stage, one of said blocks having said tension means mounted thereon, the other of said blocks having said means to apply rotary motion and said calibration means thereon.

11. A device as recited in claim 9 wherein said tension means is provided with means to prevent rotation of said torque wire during rotation of the opposite end of said torque wire by said means to apply rotary motion thereto.

References Cited in the file of this patent

UNITED STATES PATENTS

| | | |
|---|---|---|
| 2,032,381 | Stoutenburgh | Mar. 3, 1936 |
| 2,124,968 | Ahrndt et al. | July 26, 1938 |
| 2,340,277 | Sturtevant | Jan. 25, 1944 |
| 3,043,131 | Heneage | July 10, 1962 |

FOREIGN PATENTS

| | | |
|---|---|---|
| 462,316 | Italy | Mar. 9, 1951 |